(12) United States Patent
Esch et al.

(10) Patent No.: US 9,839,180 B2
(45) Date of Patent: Dec. 12, 2017

(54) WINDROW FORMING AGRICULTURAL RAKE ASSEMBLY

(71) Applicants: Sam Esch, Gordonville, PA (US); Ephraim Esch, Gordonville, PA (US)

(72) Inventors: Sam Esch, Gordonville, PA (US); Ephraim Esch, Gordonville, PA (US)

( * ) Notice: Subject to any disclaimer, the term of this patent is extended or adjusted under 35 U.S.C. 154(b) by 168 days.

(21) Appl. No.: 14/744,596

(22) Filed: Jun. 19, 2015

(65) Prior Publication Data

US 2016/0366823 A1     Dec. 22, 2016

(51) Int. Cl.
*A01D 76/00* (2006.01)
*A01D 78/00* (2006.01)
*A01D 80/00* (2006.01)
*A01D 84/00* (2006.01)
*A01D 78/10* (2006.01)

(52) U.S. Cl.
CPC ..... *A01D 78/1007* (2013.01); *A01D 78/1071* (2013.01)

(58) Field of Classification Search
CPC .. A01D 78/125; A01D 78/12; A01D 78/1078; A01D 78/02
See application file for complete search history.

(56) References Cited

U.S. PATENT DOCUMENTS

| | | | |
|---|---|---|---|
| 2,992,525 A * | 7/1961 | Irish | A01D 78/02 192/105 BA |
| 3,546,867 A * | 12/1970 | Hauser-Lienhard | A01D 78/105 56/370 |
| 3,546,868 A * | 12/1970 | Hauser-Lienhard | A01D 78/125 56/377 |
| 3,648,448 A | 3/1972 | Maugg | |
| 3,650,101 A * | 3/1972 | Aron | A01D 78/125 56/370 |
| 3,896,613 A * | 7/1975 | van der Lely | A01D 78/125 56/370 |
| 3,940,910 A * | 3/1976 | d'Acremont | A01D 57/02 56/14.4 |
| 3,946,544 A * | 3/1976 | van der Lely | A01D 78/1078 56/370 |
| 4,144,699 A | 3/1979 | Aron | |
| 4,157,644 A * | 6/1979 | van der Lely | A01D 78/125 56/192 |
| 4,194,348 A | 3/1980 | Gerlinger | |
| 4,263,774 A * | 4/1981 | DeCoene | A01D 78/12 56/370 |

(Continued)

FOREIGN PATENT DOCUMENTS

DE     2403694 A  *  7/1975  ............. A01D 81/00

*Primary Examiner* — Arpad Fabian-Kovacs (57) ABSTRACT

An agricultural rake assembly includes a frame. A plurality of wheels is coupled to the frame. A shaft is coupled to and extends upwardly from the frame. A pair of disks is rotatably coupled to the shaft. The disks are rotated when the wheels are rotated. A cam track is coupled to the shaft. A plurality of rake arms are each movably coupled between the disks. The plurality of rake arms is distributed around the disks. A plurality of rakes is coupled to each of the rake arms. The rakes may engage a crop. A plurality of cam arms is each movably coupled between the rake arms and the disks. The cam arms each urge the rake arms between a raking position, a lifted position and a lowered position when the first end of the associated one of the rake arms moves along the cam track.

12 Claims, 5 Drawing Sheets

(56) References Cited

U.S. PATENT DOCUMENTS

| | | | |
|---|---|---|---|
| 4,275,552 A | * | 6/1981 | DeCoene ............... A01D 78/12 56/370 |
| 4,785,614 A | | 11/1988 | Schoenherr |
| D299,721 S | | 2/1989 | Webster et al. |
| 4,875,332 A | | 10/1989 | Aron |
| 5,586,421 A | * | 12/1996 | Aron ...................... A01D 78/12 56/367 |
| 5,862,659 A | | 1/1999 | Aron |
| 6,250,058 B1 | * | 6/2001 | Koorn ............... A01D 78/1078 56/370 |
| 2002/0000083 A1 | | 1/2002 | Van den Engel |
| 2010/0175358 A1 | | 7/2010 | Van den Engel et al. |

* cited by examiner

WINDROW FORMING AGRICULTURAL RAKE ASSEMBLY

BACKGROUND OF THE DISCLOSURE

Field of the Disclosure

The disclosure relates to rake devices and more particularly pertains to a new rake device for positioning a crop into windrows.

SUMMARY OF THE DISCLOSURE

An embodiment of the disclosure meets the needs presented above by generally comprising a frame structured to be towed behind a vehicle. A plurality of wheels is coupled to the frame. The frame may be rolled along a support surface. A shaft is coupled to and extends upwardly from the frame. The shaft is coupled to the wheels. The shaft is rotated when the frame is rolled along the support surface. A pair of disks is coupled to the shaft. The pair of disks are spaced apart. The shaft rotates the disks. A cam track is coupled to the shaft. The cam track is positioned beneath the disks. The cam track is structured to have a raking portion, a lifted portion and a lowered portion of the cam track. A plurality of rake arms is structured to have an outer portion of the rake arms movably coupled to an inner portion of the rake arms. The rake arms are each movably coupled between the disks. A first end of each of the rake arms engages the cam track and a second end of the rake arms is positioned outwardly from the disks. The plurality of rake arms is distributed around the disks. A plurality of rakes is coupled to the outer portion of each of the rake arms. The rakes may engage a crop. A plurality of cam arms is each movably coupled between the outer portion of an associated one of the rake arms and the disks. The cam arms each urge the outer portion of the associated one of the rake arms between a raking position, a lifted position and a lowered position when the first end of the associated one of the rake arms moves along the corresponding raking, lifted and lowered portions of the cam track.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 5 thereof, a new rake device embodying the principles and concepts of an embodiment of the disclosure and generally designated by the reference numeral 10 will be described.

As best illustrated in FIGS. 1 through 5, the agricultural rake assembly 10 generally comprises a frame 12 structured to be towed behind a vehicle 14. The frame 12 may be towed in an agricultural area 16. Additionally, the agricultural area 16 may have a crop 18 or other material waiting to be arranged into windrows to be harvested. A plurality of wheels 20 coupled to the frame 12 so frame 12 may be rolled along a support surface 22. The support surface 22 may be ground.

Figure 1:
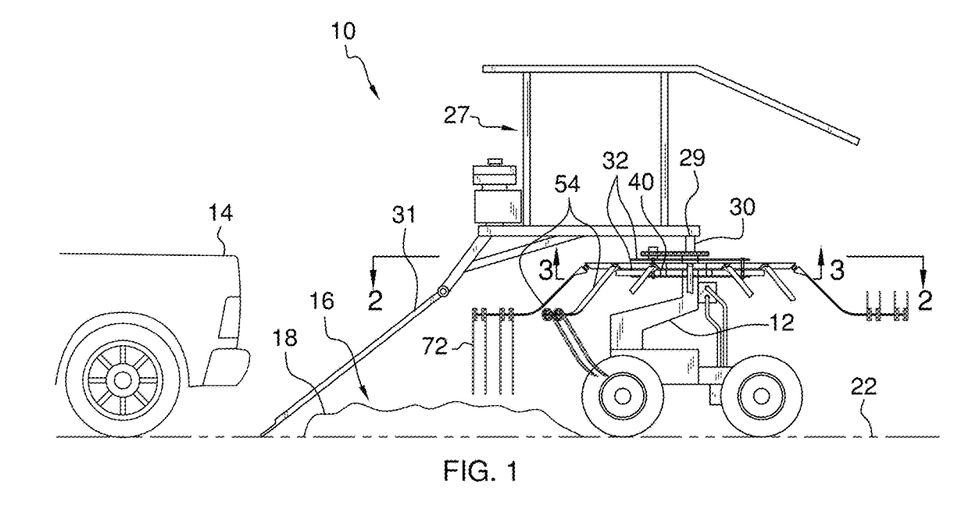
FIG. 1 is a left side view of a agricultural rake assembly according to an embodiment of the disclosure.
Figure 2:
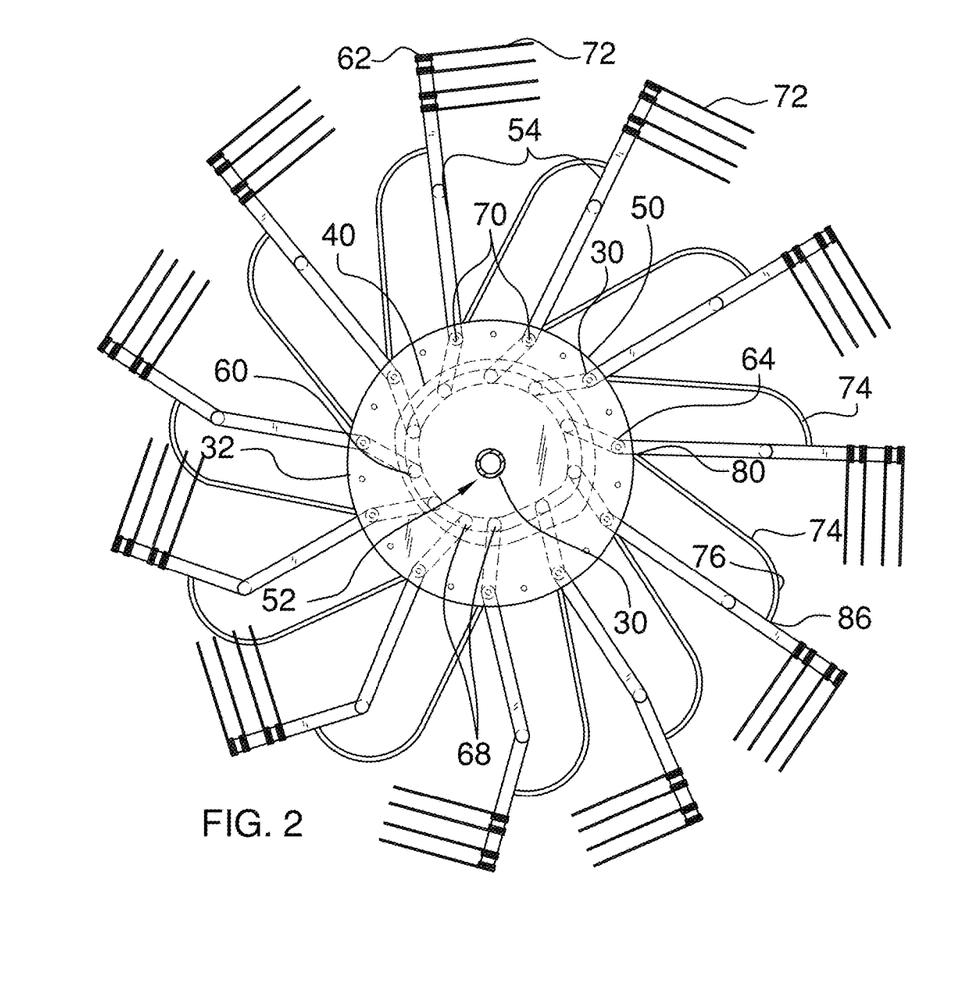
FIG. 2 is a top view of an embodiment of the disclosure.
Figure 3:
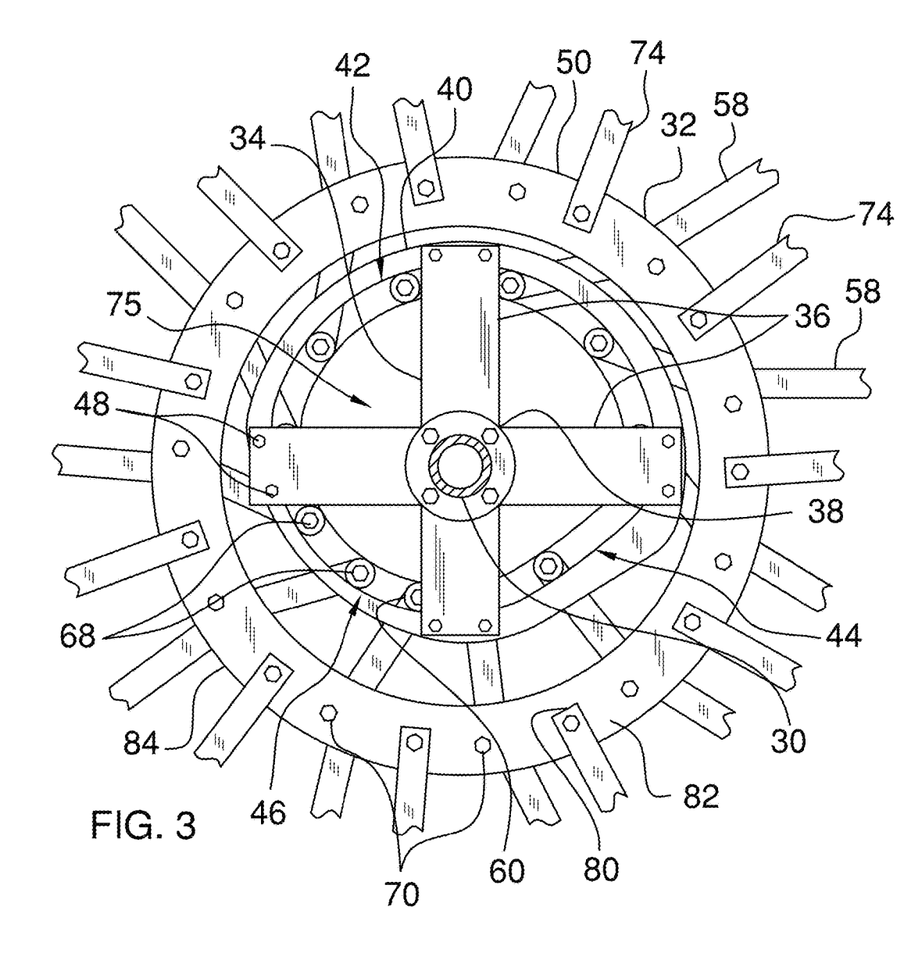
FIG. 3 is a bottom view of an embodiment of the disclosure.
Figure 4:
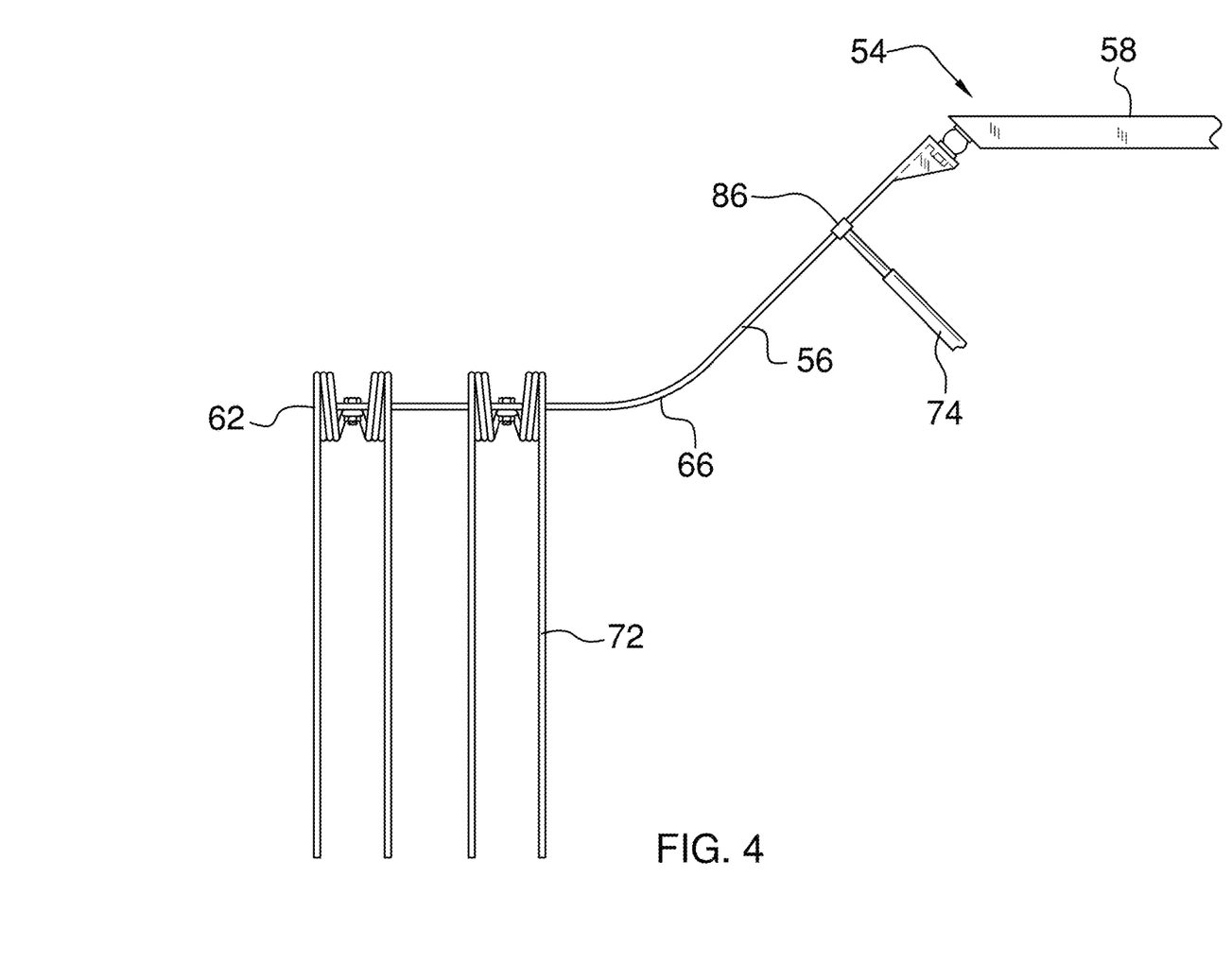
FIG. 4 is a front view of an embodiment of the disclosure.
Figure 5:
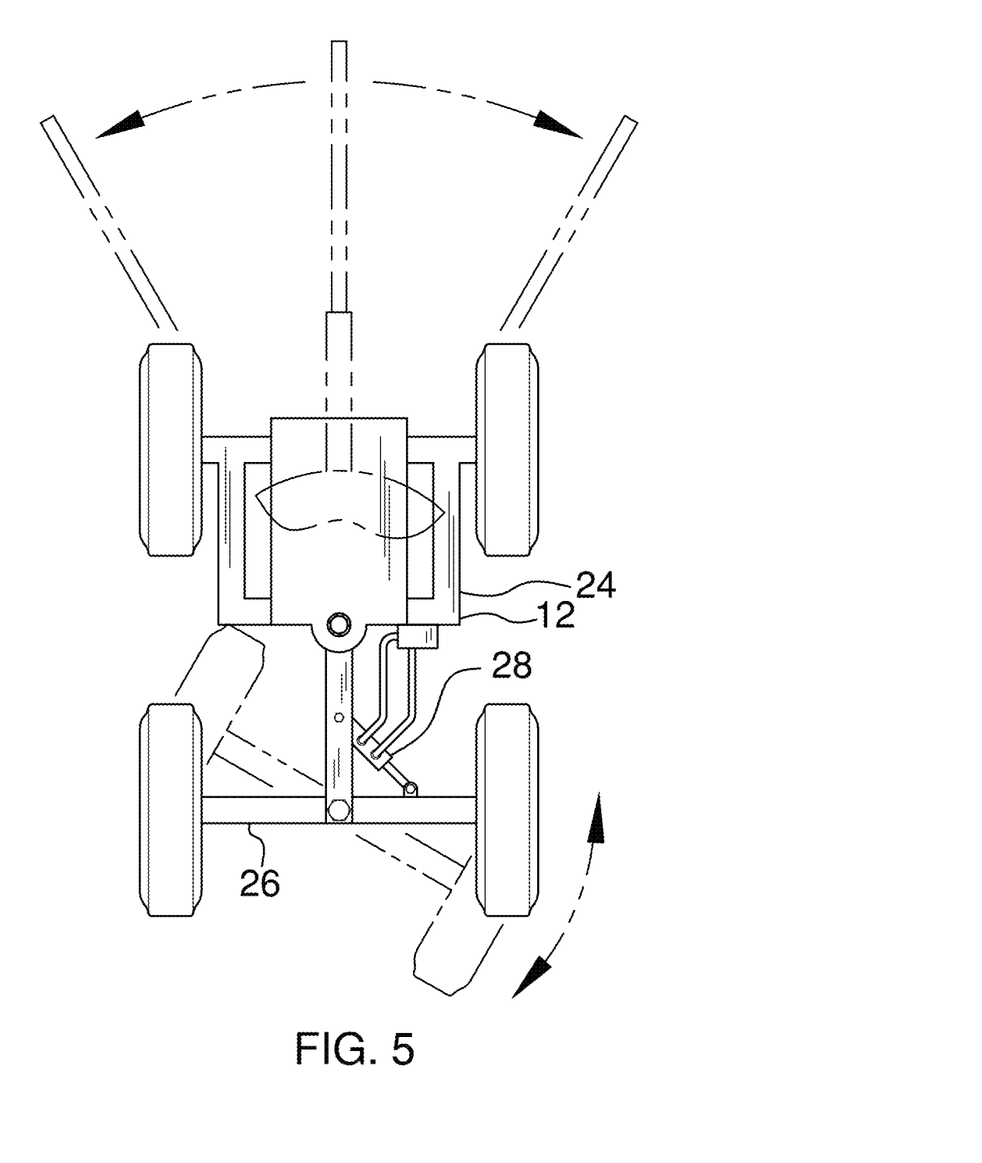
FIG. 5 is a top perspective view of a frame of an embodiment of the disclosure.

The frame 12 comprises a front portion 24 of the frame 12 hingedly coupled to a rear portion 26 of the frame 12. An actuator 28 is coupled between the front 24 and rear 26 portions of the frame 12. The actuator 28 positions the rear portion 26 of the frame 12 at a selected angle with respect the front portion 24 of the frame 12. The actuator 28 may be a hydraulic actuator of any conventional design.

A shaft 30 is coupled to and extends upwardly from the frame 12. A deck 27 is coupled to and extends upwardly from a top end 29 of the shaft 30. A tow bar 31 is movably coupled to and extends forwardly from the deck 27. The tow bar 31 may be removably coupled to the vehicle 14.

A pair of disks 32 is provided. The pair of disks 32 is rotatably coupled to the shaft 30. The shaft 30 is centrally positioned on the disks 32. The pair of disks 32 is vertically spaced apart. Each of the disks 32 is mechanically coupled to the wheels 20. Moreover, each of the disks 32 is rotated when the frame 12 is rolled along the support surface 22.

A track retainer 34 is provided. The track retainer 34 has a plurality of arms 36 extending outwardly from a center 38 of the track retainer 34. The track retainer 34 has a "+" shape. The track retainer 34 is coupled to the shaft 30 such that said track retainer 34 is positioned between the disks 322.

A cam track 40 is coupled to the track retainer 34. The cam track 40 is positioned beneath the disks 32. The cam track 40 is structured to have a raking portion 42, a lifted portion 44 and a lowered portion 46 of the cam track 40. A plurality of fasteners 48 extends through the track retainer 34 and engages the cam track 40. The fasteners 48 retain the cam track 40 on the track retainer 34.

The raking portion 42 of the cam track 40 is curved. Moreover, the raking portion 42 of the cam track 40 is curvilinear with an outer edge 50 of the disks 32. The lifted portion 44 of the cam track 40 is straight. The lifted portion 44 of the cam track 40 extends from the raking portion 42 of the cam track 40 toward a center 52 of the disks 32. The lowered portion 46 of the cam track 40 is curved. Additionally, the lowered portion 46 of the cam track 40 intersects the raking 42 and lifted 44 portions of the cam track 40.

A plurality of rake arms 54 is provided. The rake arms 54 are structured to have an outer portion 56 of the rake arms 54 movably coupled to an inner portion 58 of the rake arms 54. The rake arms 54 are each movably coupled between the disks 32. A first end 60 of each of the rake arms 54 engages the cam track 40. A second end 62 of the rake arms 54 is positioned outwardly from the disks 32. Moreover, the plurality of rake arms 54 is evenly spaced apart and distributed around and entire circumference of the disks 32.

The inner portion 58 of the rake arms 41 has a bend 64 positioned proximate the first end 60 of the rake arms 54. The inner portion 58 of the rake arms 54 has a hockey stick shape. The outer portion 56 of the rake arms 54 has a bend 66 thereon. The outer portion 56 of the rake arms 54 forms an obtuse inside angle.

A plurality of rollers 68 is coupled to the first end 60 of an associated one of the rake arms 54. The rollers 68 are positioned within the cam track 40 such that the rollers 68 move along the cam track 40. A plurality of pivots 70 is each coupled to the inner portion 58 of an associated one of the rake arms 54 proximate the bend 64 on the inner portion 58 of the rake arms 54. The pivots 70 are coupled between the disks 32. The inner portion 58 of the rake arms 54 are pivotally coupled between the disks 32. Additionally, the inner portion 58 of the rake arms 54 may move at a selected angle with respect to the center 52 of the disks 32.

A plurality of rakes 72 is coupled to the outer portion 56 of each of the rake arms 54. The plurality of rakes 72 are positioned proximate the second end 62 of each of the rake arms 54. The rakes 72 may engage the crop 18 or other material.

A plurality of cam arms 74 is provided and each of the cam arms has an inner end 80 and an outer end 86. Each of the cam arms 74 has a bend 76 thereon that is positioned closer to the outer end 86 than the inner end 80. The inner end 80 of each of the cam arms 74 is coupled to a bottom side 82 of a bottommost one 84 of the disks 32. A middle 75 of the bottommost disk 84 is open so the bottommost disk 84 form a closed ring and each of the cam arms 74 extends laterally away from the outer edge 50 of the bottommost disk 84. The outer end 86 of each of the cam arms 74 is rotatably coupled to the outer portion 56 of an associated one of the rake arms 54.

The rake arms 54 are urged outwardly away from the center 52 of the disks 32 when the rollers 68 move along the lowered portion 46 of the cam track 40. The cam arms 74 rotate the outer portion 56 of the rake arms 54 in a first direction when the rollers 68 on the rake arms 54 move along the lowered portion 46 of the cam track 40. The rakes 72 are lowered downwardly toward the support surface 22 so the rakes 72 engage the crop 18 or material.

The rake arms 54 remain stationary with respect to the center 52 of the disks 32 when the rollers 68 move along the raking portion 42 of the cam track 40. The cam arms 74 retains the outer portion 56 of the rake arms 54 in a stationary position when the roller 68 on the rake arms 54 move along the raking portion 42 of the cam track 40. The rakes 72 are retained proximate the support surface 22 so the rakes 72 may gather the crop 18.

The rake arms 54 are urged inwardly toward the center 52 of the disks 32 when the rollers 68 move along the lifted portion 44 of the cam track 40. The cam arms 74 rotate the outer portion 56 of the rake arms 54 in a second direction when the rollers 68 on the rake arms 54 move along the lifted portion 44 of the cam track 40. The rakes 72 are lifted upwardly from the support surface 22 so the crop 18 or material is arranged in the windrow.

In use, the frame 12 is towed in the agricultural area 16 to windrow the crop 18. The actuator 28 is utilized to position the frame 12 at a selected orientation with respect to the vehicle 14. The rakes 72 rotate around when frame 12 when the shaft 30 is mechanically coupled to the wheels 20. The rakes 72 gather the crop 18 or material and deposit the crop 18 or material in the windrow as the frame 12 is towed along the support surface 22. The rakes 72 produce the windrow on either side of the frame 12 while the frame 12 is towed along the support surface 22. Additionally, the assembly 10 manipulates a large volume of crop or material over a short duration of time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An agricultural rake assembly comprising:
    a frame structured to be towed behind a vehicle;
    a plurality of wheels coupled to said frame such that frame is configured to be rolled along a support surface;
    a shaft coupled to and extending upwardly from said frame;
    a pair of disks rotatably coupled to said shaft such that said pair of disks are spaced apart, each of said disks being mechanically coupled to said wheels such that said disks are rotated when said frame is rolled along the support surface;
    a cam track coupled between said disks, said cam track being structured to have a raking portion, a lifted portion and a lowered portion of said cam track;
    a plurality of rake arms structured to have an outer portion of said rake arms movably coupled to an inner portion of said rake arms, said rake arms each being movably coupled between said disks, a first end of each of said rake arms engaging said cam track such that said first end of said rake arm moves along said cam track as said disks are rotated around said shaft and a second end of said rake arms being positioned outwardly from said disks, said plurality of rake arms being distributed around said disks, said inner portion of said rake arms having a bend positioned proximate said first end of said rake arms such that said inner portion of said rake arms has a hockey stick shape, said outer portion of said rake arms having a bend thereon such that said outer portion of said rake arms forms an obtuse inside angle;
    a plurality of rakes coupled to said outer portion of each of said rake arms such that said rakes are configured to engage a crop;
    a plurality of cam arms each movably coupled between said outer portion of an associated one of said rake arms and said disks, said cam arms each urging said outer portion of said associated one of said rake arms between a raking position, a lifted position and a lowered position when said first end of said associated one of said rake arms moves along the corresponding raking, lifted and lowered portions of said cam track; and a plurality of pivots each coupled to said inner portion of said rake arms proximate said bend of said inner portion of said rake arms, said pivots being coupled between said disks such that inner portion of said rake arms is pivotally coupled between said disks.

2. The assembly according to claim 1, further comprising said raking portion of said cam track being semi-circular such that said raking portion of said cam track is curvilinear with an outer edge of said disks.

3. The assembly according to claim 2, further comprising said lifted portion of said cam track being straight such that said lifting portion of said cam track extends from said raking portion of said cam track toward a center of said disks.

4. The assembly according to claim 3, further comprising said lowered portion of said cam track being curved such that said lowered portion of said cam track extends between said raking and lifting portions of said cam track.

5. The assembly according to claim 1, further comprising a plurality of rollers each coupled to said first end of an associated one of said rake arms, said rollers being positioned within said cam track such that said rollers move along said cam track.

6. The assembly according to claim 1, further comprising each of said cam arms having an inner end and an outer end, each of said cam arms having a bend thereon being positioned closer to said outer end than said inner end.

7. The assembly according to claim 6, further comprising said inner end of each of said cam arms being coupled to a bottom side of a bottommost one of said disks such that said cam arms extends laterally away from an outer edge of said bottommost disk.

8. The assembly according to claim 7, further comprising said outer end of each of said cam arms being rotatably coupled to said outer portion of an associated one of said rake arms.

9. The assembly according to claim 8, further comprising said cam arms rotating said outer portion of said rake arms in a first direction when a roller on said rake arms moves along said lifted portion of said cam track such that said rakes are lifted upwardly from the support surface wherein the crop is arranged in windrow.

10. The assembly according to claim 9, further comprising said cam arms rotating said outer portion of said rake arms in a second direction when said roller on said rake arms moves along said lowered portion of said cam track such that said rakes are lowered downwardly toward the support surface wherein said rakes engage the crop.

11. The assembly according to claim 10, further comprising said cam arms retaining said outer portion of said rake arms in a stationary position when said roller on said rake arms moves along said raking portion of said cam track such that said rakes are retained proximate the support surface wherein said rakes gather the crop.

12. An agricultural rake assembly comprising:
a frame structured to be towed behind a vehicle;
a plurality of wheels coupled to said frame such that frame is configured to be rolled along a support surface;
a shaft coupled to and extending upwardly from said frame;
a pair of disks rotatably coupled to said shaft such that said pair of disks are spaced apart, each of said disks being mechanically coupled to said wheel such that said disks are rotated on said shaft when said frame is rolled along the support surface;
a cam track coupled between said disks, said cam track being structured to have a raking portion, a lifted portion and a lowered portion of said cam track;
said raking portion of said cam track being semi-circular such that said raking portion of said cam track is curvilinear with an outer edge of said disks;
said lifted portion of said cam track being straight such that said lifting portion of said cam track extends from said raking portion of said cam track toward a center of said disks;
said lowered portion of said cam track being curved such that said lowered portion of said cam track extends between said raking and lifting portions of said cam track;
a plurality of rake arms structured to have an outer portion of said rake arms movably coupled to an inner portion of said rake arms, said rake arms each being movably coupled between said disks, a first end of each of said rake arms engaging said cam track such that said first end of said rake arm moves along said cam track as said disks are rotated around said shaft and a second end of said rake arms being positioned outwardly from said disks, said plurality of rake arms being distributed around said disks;
said inner portion of said rake arms having a bend positioned proximate said first end of said rake arms such that said inner portion of said rake arms has a hockey stick shape;
said outer portion of said rake arms having a bend thereon such that said outer portion of said rake arms forms an obtuse inside angle;
a plurality of rollers coupled to said first end of an associated one of said rake arms, said rollers being positioned within said cam track such that said rollers move along said cam track;
a plurality of pivots each coupled to said inner portion of said rake arms proximate said bend of said inner portion of said rake arms, said pivots being coupled between said disks such that inner portion of said rake arms is pivotally coupled between said disks;
a plurality of rakes coupled to said outer portion of each of said rake arms such that said rakes are configured to engage a crop; and
a plurality of cam arms, each of said cam arms having an inner end and an outer end, each of said cam arms having a bend thereon being positioned closer to said outer end than said inner end, said inner end of each of said cam arms being coupled to a bottom side of a bottommost one of said disks such that said cam arms extends laterally away from said outer edge of said bottommost disk, said outer end of each of said cam arms being rotatably coupled to said outer portion of an associated one of said rake arms;
said cam arms rotating said outer portion of said rake arms in a first direction when said roller on said rake arms moves along said lifted portion of said cam track such that said rakes are lifted upwardly from the support surface wherein the crop is arranged in windrow;
said cam arms rotating said outer portion of said rake arms in a second direction when said roller on said rake arms moves along said lowered portion of said cam track such that said rakes are lowered downwardly toward the support surface wherein said rakes engage the crop; and said cam arms retaining said outer portion of said rake arms in a stationary position when said roller on said rake arms moves along said raking portion of said cam track such that said rakes are retained proximate the support surface wherein said rakes gather the crop.

* * * * *